US009214001B2

(12) United States Patent
Rawle

(10) Patent No.: US 9,214,001 B2
(45) Date of Patent: Dec. 15, 2015

(54) AUTOMATIC CONTACT CENTER AGENT ASSISTANT

(75) Inventor: Jerry David Rawle, Hendersonville, TN (US)

(73) Assignee: Aspect Software Inc., Chelmsford, MA (US)

(*) Notice: Subject to any disclaimer, the term of this patent is extended or adjusted under 35 U.S.C. 154(b) by 0 days.

(21) Appl. No.: 11/674,500

(22) Filed: Feb. 13, 2007

(65) Prior Publication Data

US 2008/0195659 A1 Aug. 14, 2008

(51) Int. Cl.
  *G06F 17/30* (2006.01)
  *G06Q 90/00* (2006.01)
  *G06Q 10/06* (2012.01)
  *H04M 3/51* (2006.01)

(52) U.S. Cl.
  CPC ........ *G06Q 90/00* (2013.01); *G06Q 10/063112* (2013.01); *G06F 17/30684* (2013.01); *H04M 3/5191* (2013.01)

(58) Field of Classification Search
  USPC .......................................................... 707/6
  See application file for complete search history.

(56) References Cited

U.S. PATENT DOCUMENTS

| 6,104,989 | A  | * | 8/2000  | Kanevsky et al. ............... 704/9 |
| 6,278,996 | B1 | * | 8/2001  | Richardson et al. .................. 1/1 |
| 6,393,423 | B1 | * | 5/2002  | Goedken ............................... 1/1 |
| 6,826,745 | B2 |   | 11/2004 | Coker et al. |
| 6,947,933 | B2 | * | 9/2005  | Smolsky ......................... 707/693 |
| 6,976,020 | B2 | * | 12/2005 | Anthony et al. ..................... 1/1 |
| 7,031,961 | B2 | * | 4/2006  | Pitkow et al. ......................... 1/1 |
| 7,043,474 | B2 | * | 5/2006  | Mojsilovic et al. ............... 707/6 |
| 7,076,427 | B2 |   | 7/2006  | Scarano et al. |
| 7,487,094 | B1 | * | 2/2009  | Konig et al. .................... 704/270 |
| 7,885,844 | B1 | * | 2/2011  | Cohen et al. ........................... 1/1 |
| 2001/0049688 | A1 | * | 12/2001 | Fratkina et al. ............ 707/104.1 |
| 2002/0022986 | A1 |   | 2/2002  | Coker et al. |
| 2002/0059228 | A1 | * | 5/2002  | McCall et al. ..................... 707/6 |
| 2003/0018629 | A1 | * | 1/2003  | Namba ............................. 707/3 |
| 2003/0093428 | A1 | * | 5/2003  | Suzumori et al. ............... 707/10 |
| 2003/0179876 | A1 | * | 9/2003  | Fox et al. ................. 379/265.02 |
| 2004/0054693 | A1 | * | 3/2004  | Bhatnagar .................. 707/104.1 |
| 2004/0083213 | A1 | * | 4/2004  | Wu et al. ............................ 707/4 |
| 2004/0264652 | A1 | * | 12/2004 | Erhart et al. .............. 379/88.01 |
| 2005/0129216 | A1 |   | 6/2005  | Tsujiuchi |
| 2005/0228790 | A1 | * | 10/2005 | Ronnewinkel et al. ........... 707/6 |
| 2005/0238161 | A1 | * | 10/2005 | Yacoub et al. ........... 379/265.06 |
| 2005/0246355 | A1 | * | 11/2005 | Ito ................................. 707/100 |
| 2006/0026114 | A1 | * | 2/2006  | Gregoire et al. .................. 707/1 |
| 2006/0233347 | A1 |   | 10/2006 | Tong et al. |
| 2006/0282389 | A1 | * | 12/2006 | Gupte ............................. 705/52 |
| 2007/0033184 | A1 | * | 2/2007  | Friedman .......................... 707/6 |

OTHER PUBLICATIONS

Jennifer Golbeck; "Semantic Web Interaction on Internet Relay Chat" 2004; pp. 1-5.*

* cited by examiner

*Primary Examiner* — Amresh Singh
(74) *Attorney, Agent, or Firm* — Husch Blackwell LLP

(57) ABSTRACT

A method and apparatus are provided for presenting information to an agent of an organization. The method includes the steps of the organization detecting a contact with a client of the organization, classifying the contact based upon information delivered along with the contact and delivering the contact to the agent. The method further includes the steps of retrieving a set of reference key words and key words in context based upon the classification of the contact, detecting keywords and keywords in context from a dialog between the agent and client, matching at least some of the detected keywords and key words in context with the reference keywords and keywords in context, identifying information within a database based upon the matching and presenting the identified information to the agent.

24 Claims, 3 Drawing Sheets

AUTOMATIC CONTACT CENTER AGENT ASSISTANT

FIELD OF THE INVENTION

The field of the invention relates to automatic contact distributors and more particularly to methods of presenting information to agents of the automatic contact distributor.

BACKGROUND OF THE INVENTION

Contact centers and automatic contact distribution systems are generally known. Such systems are used whenever an organization must handle large numbers of contacts with clients of the organization.

In order to handle contacts with clients, the organization may employ a number of agents who are knowledgeable about the organization and its products and/or objectives. The organization may also provide a database of client information that is accessible by the agents to help the agents in addressing the concerns of clients.

The organization may also use an automatic contact distribution system to connect agents with clients. The automatic contact distribution system may handle both incoming an outgoing contacts. As contacts arrive, they may be assigned to agents based upon any of a number of different criteria (e.g., first available, best qualified, etc.).

In some systems, at least some agents may be assigned to initiating outgoing contact to clients while other agents receive incoming contacts. As loading increases, the number of incoming contacts may exceed the number of agents assigned to receiving incoming contacts and any extra incoming contacts may be placed in a contact queue. At some level, if the contact queue becomes too long, then the system may suspend outgoing contacts and assign some or all of the outgoing agents to answering incoming contacts.

The automatic contact distributor may also function to identify the clients to the agents in advance of contact delivery. The identification of clients may be accomplished by matching contact information (e.g., ANI, URL, etc.) of a contact with contact information from prior client interactions.

While such features have increased their effectiveness, agents still need extensive knowledge about the organization, the client database of the organization and the communication system over which contacts occur. Often a customer inquiry will require a search of the database for related information or transfer of the contact to a more knowledgeable agent.

In general, contact center agents can require extensive training and knowledge in order to rapidly respond to client issues and needs. With high agent turn-over and rapidly changing products and technologies, there is a need for ways of improving the ability of an agent to locate available options in dealing with the specifics of client contacts.

SUMMARY

A method and apparatus are provided for presenting information to an agent of an organization. The method includes the steps of the organization detecting a contact with a client of the organization, classifying the contact based upon information delivered along with the contact and delivering the contact to the agent. The method further includes the steps of retrieving a set of reference key words and key words in context based upon the classification of the contact, detecting keywords and keywords in context from a dialog between the agent and client, matching at least some of the detected keywords and key words in context with the reference keywords and keywords in context, identifying information within a database based upon the matching and presenting the identified information to the agent.

DETAILED DESCRIPTION OF AN ILLUSTRATED EMBODIMENT

Figure 1:
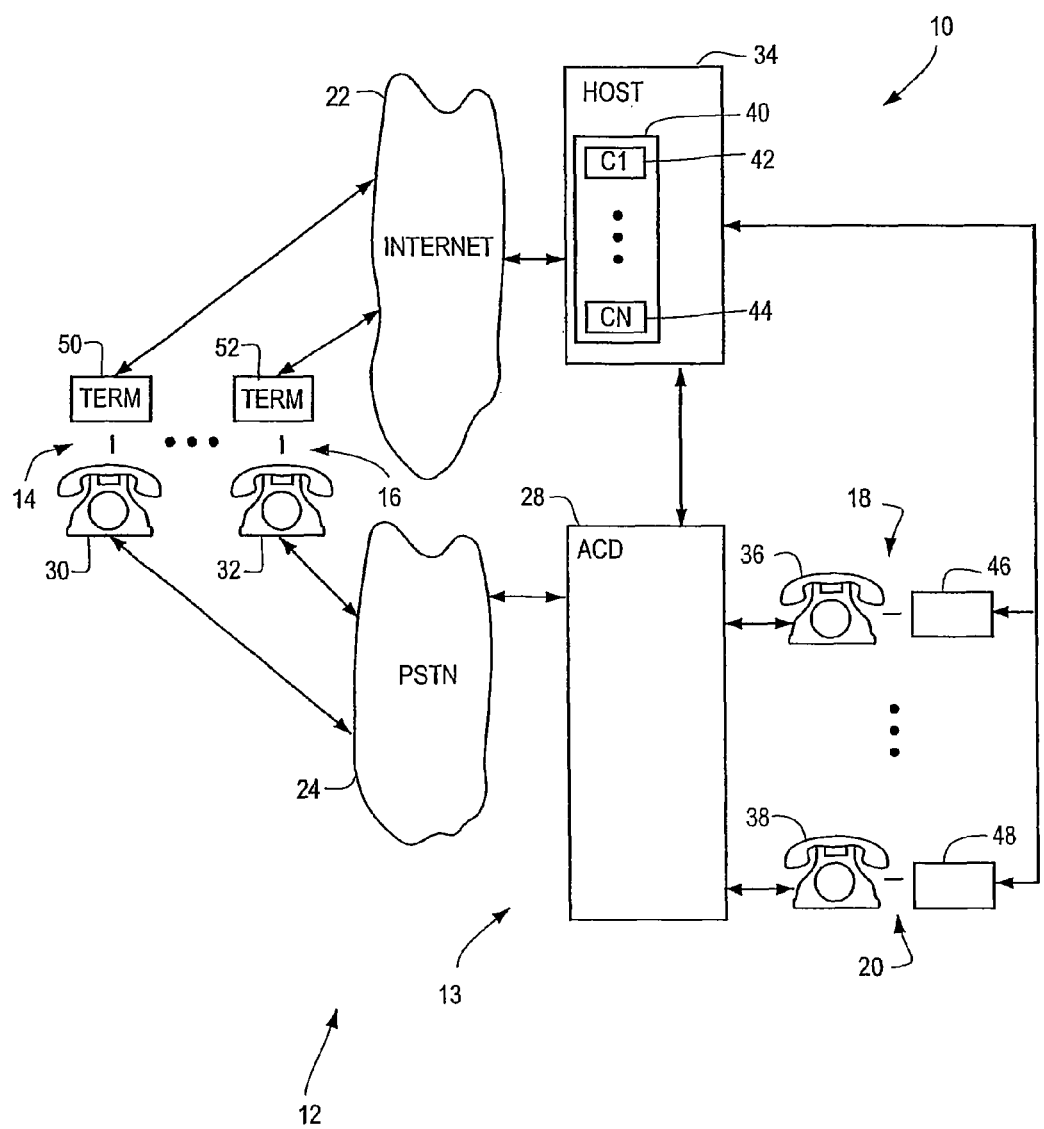
FIG. 1 depicts a communication system with an agent information presentation system in accordance with an illustrated embodiment of the invention.

FIG. 1 depicts a communication system 12 shown generally in accordance with illustrated embodiments of the invention. Included within the communication system 12 is a contact processing system 13 used by an organization to distribute contacts to agents 18, 20 of the organization.

Included within the contact processing system 13 is an information identification and presentation system 10 that automatically identifies information for an agent based upon a context of a contact with a client. The information identification system 10 monitors a connection between the client and agent and presents information to the agent based upon a content of the exchange between the client and agent.

As shown in FIG. 1, contacts with clients 14, 16 may be established under any of a number of different formats. For example, clients 14, 16 may use a client telephone 30, 32 to may place or receive telephone calls with the organization through a public switch telephone network (PSTN) 24 or voice over IP (VoIP) through the Internet 22 and an automatic call distributor (ACD) 28 of the organization. In the case where a client 14, 16 places a call to the organization, features within the PSTN 24 such as DNIS and ANI may be used to detect the number dialed by the client 14, 16 as well as to identify the client 14, 16 to the organization in advance of call delivery to the ACD 28. The identification of the number called and identity of the client 14, 16 may be used by the organization as an indication of the purpose of the call. For example, where the organization has many different departments, the use of DNIS may be used to detect the intended target of the call.

Similarly, where ANI is delivered along with the call, programming within the ACD 28 and host 34 may cause the ANI information to be delivered to the host 34. The host 34 may search a client database 40 to identify the client 14, 16 and any information previously collected regarding this client 14, 16.

By knowing the number called and the identity of the client 14, 16, a call routing application within the ACD 28 may be used to select the agent 18, 20 that is best qualified to handle the call from the client 14, 16. For example, if from the ANI information, a client file 42 is identified, then the information within the file 42 may be used to identify preferences and requirements of the client. The ACD application may also present the client with a menu through which additional information may be collected from the client. With this information, an agent 18, 20 may be selected who is best qualified to handle the preferences and requirements of the client 14, 16.

Rather than receiving a call from a client 14, 16, the organization may also place outgoing calls to clients 14, 16. Outgoing calls to clients 14, 16 may be initiated for any number of reasons directed to advancing the agenda of the organization.

Outgoing calls may be placed to previous clients 14, 16 of the organization or the organization may purchase contact lists from a third party. In the case of outgoing calls to existing clients 14, 16, the client files 42, 44 may also be used to identify the most qualified agent 18, 20 to handle the call from prior knowledge of the client.

In any case, once an agent 18, 20 has been identified to handle the call, the ACD 28 may transfer the call to a telephone 36, 38 of the selected agent 18, 20. At the same time, the ACD 28 may transfer an identifier of the selected agent 18, 20 to the host 34. The host 34 may respond by sending the client file 42, 44 to a terminal 46, 48 of the selected agent 18, 20. The terminal 46, 48 of the selected agent 18, 20 may display the information as a screen pop at the same instant as the call is delivered to the agent 18, 20. By being able to view the client record 42, 44 at the same time the call is delivered to the agent 18, 20, the agent may be better able to address the concerns of the client.

Alternatively, the organization may provide a web site within the host 34 to advance the agenda of the organization. Clients 14, 16 may use a client terminal 50, 52 to visit the web site of the organization through the internet 22 and to view one or more web pages sponsored by the organization.

Provided on the one or more web pages may be an e-mail address, a telephone number or a SPEAK WITH AN AGENT softkey. The SPEAK WITH AGENT softkey may activate a chat function that allows the client to enter and send a chat message to the organization.

If the client 14, 16 sends a chat message via activation of the SPEAK WITH AN AGENT softkey, the host 34 may process the chat message as a contact to be distributed to an agent 18, 20. The host 34 may first retrieve a URL or HTML cookie of the client 14, 16 to determine if the client 14, 16 is a past client or a new contact. If the client 14, 16 is a past client, then the URL or HTML cookie may be used to identify a client file 42, 44. In either case, the host 34 may use a subject matter of the web page from which the request originated (and possibly a client file 42, 44) as an indication of the subject matter of the contact and select an agent 18, 20 accordingly.

If the client 14, 16 should send an e-mail to the organization, then the process may proceed in a similar manner. In this case, the destination e-mail address of the e-mail may be used as an indication of the subject matter of the contact. A source e-mail address of the client 14, 16 may be used as another indicator for purposes of selecting an agent 18, 20 to handle the contact.

As part of the agent selection process, the host 34 classifies the contact with the client 14, 16. Classification may be based upon DNIS and/or ANI in the case of a telephone call or upon a URL of the client and/or any web pages visited by the client 14, 16. In addition to agent selection, classification may also be used to select a keyword database for use by the information identification system 10.

Figure 2:
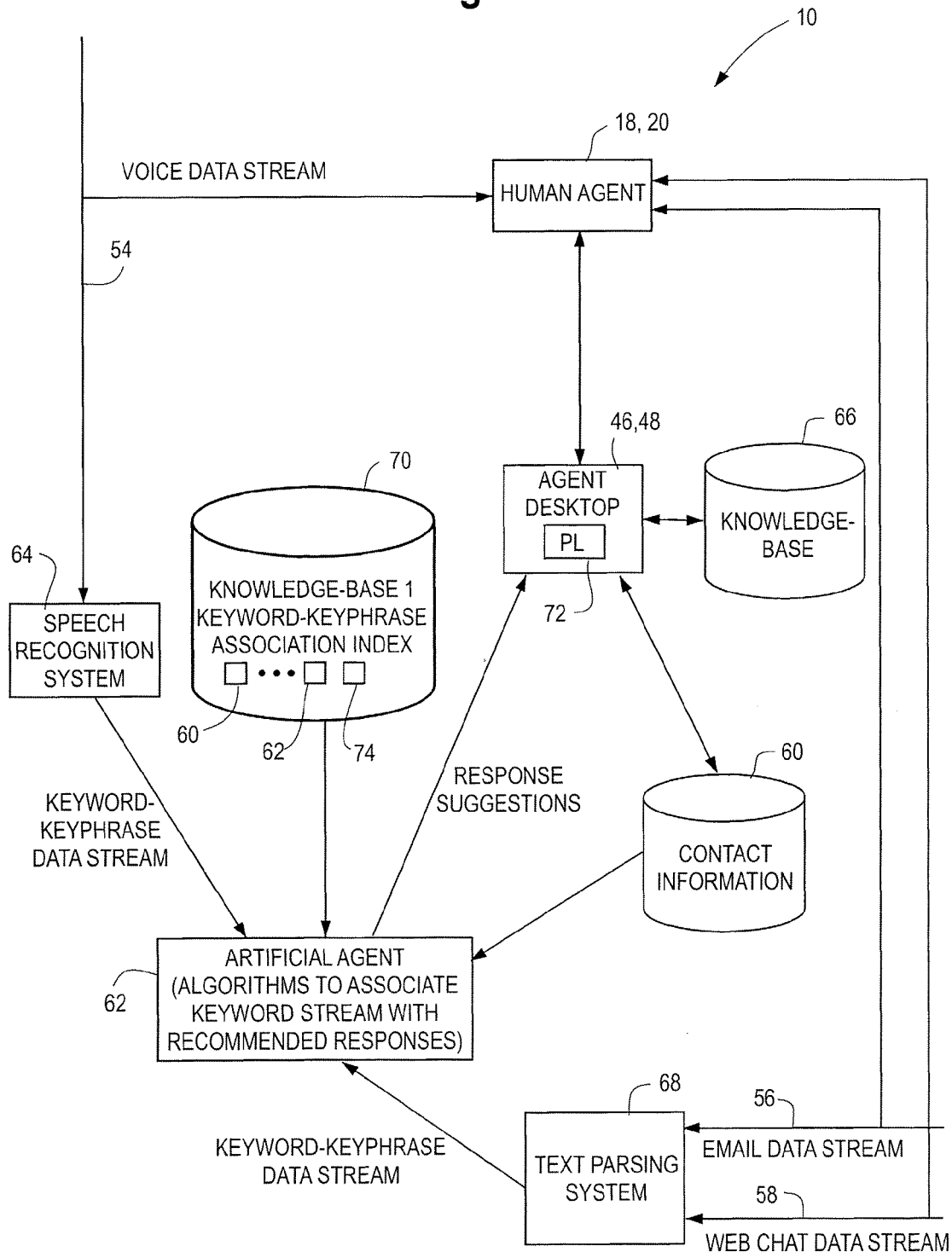
FIG. 2 depicts the agent information presentation system of FIG. 1.

FIG. 2 is a block diagram of the information identification system 10. While the system 10 is shown as being separate from the agent terminal 46, 48, it should be understood that the system 10 may be located anywhere within the host 34, the ACD 28 or agent terminal 46, 48.

Included within the system 10 is a content analyzer or artificial agent 62 that analyzes communicated information exchanged between the agent 18, 20 and client 14, 16 and that presents suggestions to the agent 18, 20 on a terminal 46, 48 of the agent. Included within the terminal 46, 48 is agent desktop software that operates in conjunction with the artificial agent 62. This agent desktop software responds to agent actions and also acts as the interface through which the artificial agent 62 presents its suggestions to the agent. Recommended responses are presented in a list sorted by a ranking of importance. Recommended responses are not removed from the ranked list, but new recommendations may be added to a top of the list with older responses scrolled downwards as the contact conversation continues.

A focus feature may be used to control scrolling. For example, if the agent's cursor is over part of the list, then the downward scrolling is stopped even though new recommendations are still being added to the top of the list. This is done to prevent the agent 18, 20 from accidentally clicking on the wrong item due to the downward scrolling.

The information system 10 may also include a speech recognition system 64. The speech recognition system 64 processes a voice signal from a telephone input 54 and generates a stream of text data. This text may be a complete representation of the conversation from both agent and client or may only be a partial representation of the voice data including words spoken by the client 14, 16 or agent 18, 20.

The information system 10 may also include a text parsing system 68. The text parsing system 68 may be used for contacts other than voice. The text parsing system 68 parses a text data stream (e-mail, chat, etc.) and normalizes the stream for the artificial agent 62. This normalization may include removal of extraneous text such as emoticons or extraction of only key words and phrases.

Available within the system 10 may be a number of sets of reference keywords and keyword phrases 60, 62. Each set of keywords and keyword phrases 60, 62 may be associated with a particular contact classification or type of contact. For example, if the organization were a merchant who sells a first type of product (i.e., widget A) and also a second type of product (i.e., widget B), then a first set of keywords and keyword phrases (e.g., keyword set 60) may be associated with widget A and a second set of keywords and keyword phrases (i.e., keyword set 62) may be associated with the widget B. In this case, the keywords and keyword phrases may be technical or even non-technical terms related to a particular product. In each case, each keyword or keyword phrase in the keyword lists 60, 62 may be associated with and together are used to identify and retrieve a particular block of information. Similarly, keywords in combination or sequences of keywords detected over some predefined period of time may refer to and be used to identify other blocks of information.

As contacts with client 14, 16 are received by the system 13, a contact processor 60 may classify the contact. Under one illustrated embodiment, classification means retrieving a client record 42, 44 after first identifying the client 14, 16 and classifying the client 14, 16 based upon prior contacts with the client 14, 16. In the example offered above, if the client 14, 16 had previously purchased a widget A, then the client 14, 16 would be classified as a widget A user and the first keyword set 60 would be identified for use with the client 14, 16. If the client 14, 16 has previously purchased both widgets A and B then more than one keyword set 60, 62 may be used.

Under other illustrated embodiments, classification may be based upon the context of the received contact. In the case of the client 14, 16 visiting a web site of the organization, the classification may be based upon any web pages visited or the web page from which the SPEAK WITH AGENT softkey was activated.

In the case of the client initiating a contact with the organization, the contact destination (as determined via DNIS or an e-mail destination address) may be used to classify contacts. In general, the contact is classified by customer information and any other information gathered from the contact prior to queueing.

The retrieved keyword set 60, 62 may be transferred to a matching processor 78 where the content of the keyword set(s) is compared with the exchanges between the agent 18, 20 and client 14, 16 (as provided by the speech recognition system 64 or text parsing system 68). The artificial agent 62 determines an information context of the contact from any matches between the stream of key words and/or phrases and the lists 60, 62 and constructs a prioritized list of recommended information resources 72. The possible resources are given a relative priority calculated by matching the content of the keyword data stream to the knowledge base index 70 in the keyword context of the contact classification. This prioritized list 72 is constantly updated and re-ordered based on the latest input from the data stream.

The knowledge base 70 is the contact specific content database that is useful to agents when fielding and responding to client concerns. The knowledge database 70 may include articles, agent response scripts, or software applications that can be executed from the agent desktop.

Included within the knowledge base 70 is a knowledge-base keyword association index 74. The knowledge-base keyword association index 74 is a database cross-reference that associates knowledge-base content (i.e., information that is to be presented to the agent) with key words and phrases (and combinations thereof) as they may occur during an exchange of a contact. One possible implementation of this index divides the cross-reference into a catalog of customer classes. Clients may belong to one or more classes based on previous transactions with the organization. Each class would have its own dictionary of key words.

Each dictionary contains one or more sets of key words and keywords in context 60, 62. Each set 60, 62 has different combinations of key words and key words in context and is associated via the keyword association index 74 with a different information resource.

Each dictionary entry has a set of weighted links to the knowledge-base content of the information resource. The dictionary may also included key phrases in the form of N-Grams, with N denoting the longest allowed phrase length. Phrases are strings of length 2 to N words that may appear in order in a communication session of a contact. These phrase entries would also have a weighted set of links to knowledge-base content.

Prioritization may be accomplished by the weighted links to information. For example, a predetermined set of reference key words and phrases may be associated with each information reference. Each reference key word and phrase may have a weight associated with detection of the key word or phrase in the dialog. The weights of each matched key word and key word in context are summed among the various sets 60, 62. The more matches that are found between the reference key words and phrases associated with an information reference and the dialog, the higher the score or prioritization weight for that reference. Prioritization of references displayed to the agent may occur with the highest scoring reference displayed first, the second highest below that, and so on.

Figure 3:
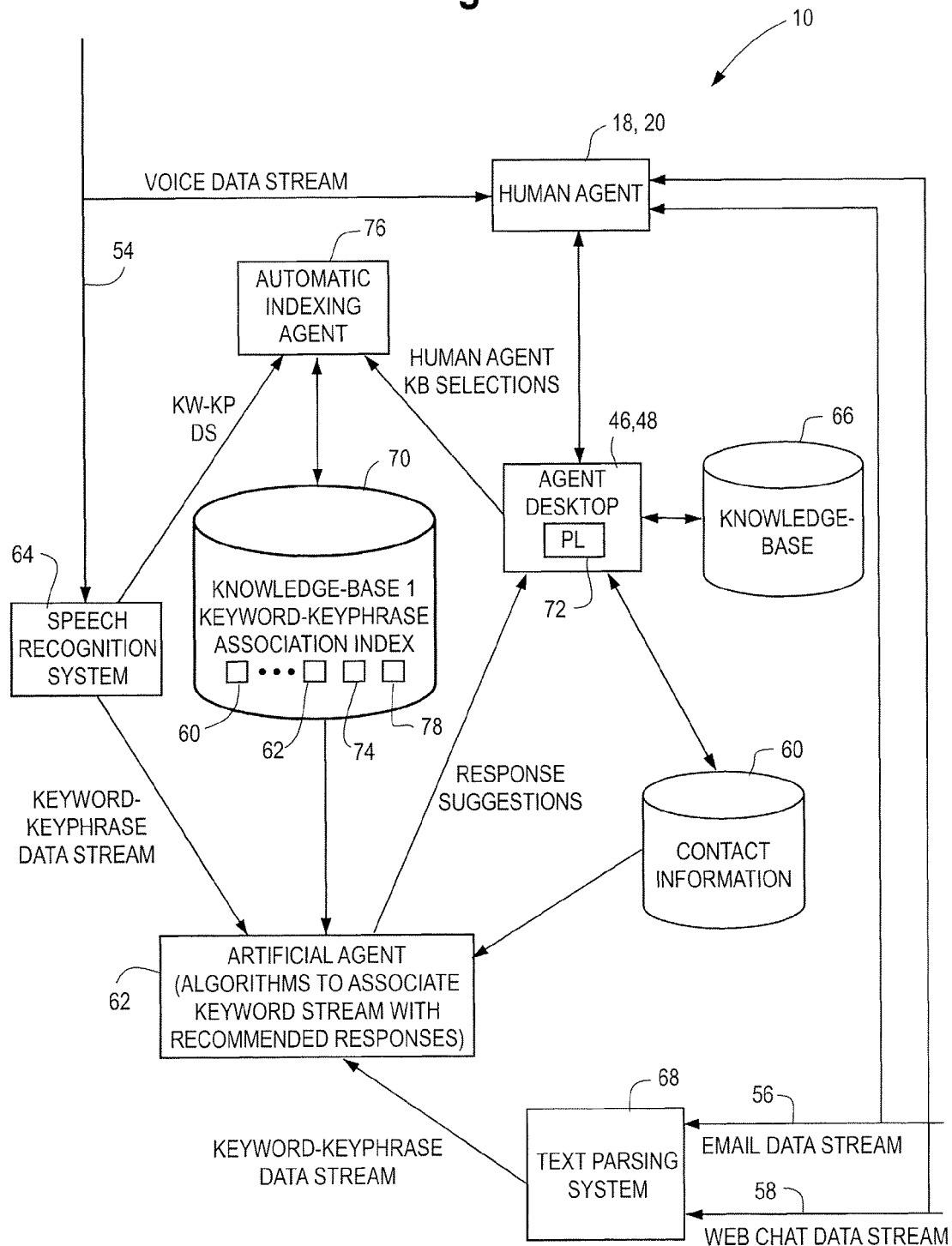
FIG. 3 depicts the agent information presentation system of FIG. 2 under an alternate embodiment.

FIG. 3 depicts the system 10 under another illustrated embodiment. The system 10 of FIG. 3 is similar to the system of FIG. 2 with the addition of an automatic indexing agent 76. The automatic indexing agent 76 automatically maintains and adjusts the association index between the key words and phrases (or combinations of key words and phrases) and the underlying information associated with the key words and phrases (or combinations of key words and phrases). The automatic indexing agent 76 receives the keywords and phrases data stream from the speech recognition system 64 or text parsing system 68 as appropriate for the mode of contact. The automatic indexing agent 76 also receives the contact classification information used by the artificial agent 62. When the human agent 18, 20 selects content from the knowledge base 70, the agent desktop 46, 48 notifies the automatic indexing agent 76 of the selection. The automatic indexing agent 76 may use the selections by the human agent 18, 20 on a statistical basis to automatically correct and adjust the linkage between the key words and N-Grams and underlying source information presented in the prioritized list 72. The linkage may be adjusted by changing the weights of key words and N-Gram phrases found in the text stream or by creating new linkages between key words and N-Gram phrases found in the text stream and information selected by the agent 18, 20.

In another illustrated embodiment, human agents 18, 20 may be assigned weights for purposes of adjusting the linkage between key words and N-Grams and the information presented in the prioritized list 72. In this case, at least some agents may be assigned a higher weight to their selections by the indexing agent 76 to indicate their experience or performance leadership within the contact center. In this way, selections from more experienced human agents 18, 20 may have more impact on the correction of the associations generated between keywords and phrases and information presented in the prioritized list 72.

A specific embodiment of method and apparatus for displaying information on a computer terminal of an agent has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of presenting information to a human agent of a plurality of human agents of a contact distribution system of an organization for handling a plurality of at least one of inbound and outbound contacts with human clients, such method comprising:

the organization contact distribution system detecting a contact of the plurality of contacts with a human client of the organization;

automatically classifying the client into a respective classification of a plurality of client classifications based upon information delivered along with the contact, each respective classification associated with a respective dictionary of reference key words and keywords in context with weighted links to information resources in an associated database;

automatically selecting a human agent of the plurality of human agents to handle the contact by a dialog between the agent and the client, and delivering the contact to a communications device of the human agent to permit the human agent to conduct the dialog with the client;

automatically retrieving the respective dictionary of reference key words and key words in context based upon the classification of the client;

automatically monitoring the dialog between the human agent and the human client, and automatically detecting keywords and keywords in context from the dialog as they occur during the dialog between the human agent and the human client;

automatically matching at least some of the detected keywords and key words in context with the respective reference keywords and keywords in context;

automatically analyzing information exchanged between the agent and the client to identify information useful to the agent for responding to the client during the contact within the associated database based upon the matching; and presenting during the dialog the identified information and a list of a plurality of recommended responses sorted by ranking of importance and continually updated during the dialog based upon agent selections, to the agent on an agent terminal device for selection by the agent during the dialog between the human agent and the human client.

2. The method of presenting information as in claim 1 wherein classifying the contact type further comprises identifying a web page from which the contact originated.

3. The method of presenting information as in claim 2 wherein the information delivered along with the contact further comprises an identifier selected from the group consisting of ANI, URL and e-mail and wherein the client is classified based upon prior contacts with the client.

4. The method of presenting information as in claim 3 wherein classifying the contact type further comprises retrieving client information using the identifier delivered along with the contact.

5. The method of presenting information as in claim 1 wherein classifying the contact type further comprises detecting a contact destination provided by the client.

6. The method of presenting information as in claim 1 wherein the step of presenting the information further comprising presenting the list of a plurality of recommended responses with new recommendations added during the dialog with older recommended responses scrolled downward as the dialog continues.

7. The method of presenting information as in claim 6 wherein the step of providing the plurality of recommended responses further comprises prioritizing and continually updating and reordering the list of the plurality of recommended responses, and stopping the scrolling when a cursor is placed over part of the list.

8. The method of presenting information as in claim 7 wherein the step of prioritizing further comprises summing a weight of each matched keyword and presenting the information with a greatest relative weight first and adjusting the summed weights by creating linkages between key words based on selections made by the agent and adjusting the linkages based upon selection weightings assigned to the agents.

9. An apparatus for presenting information to a human agent of an automatic contact distribution system of an organization, such apparatus comprising:

means for detecting a contact with a human client of the organization at the automatic contact distribution system;

means for classifying the client into a respective classification of a plurality of client classifications based upon information delivered along with the contact, each respective classification associated with a respective dictionary of reference keywords and keywords in context with weighted links to information resources in an associated database;

means for automatically selecting a human agent from a plurality of human agents to handle the contact by a dialog between the agent and the client and for delivering the contact to a communications device of the human agent to permit the human agent to conduct the dialog with the client;

means for automatically retrieving the respective dictionary of reference key words and key words in context based on the classification of the client;

means for automatically monitoring the dialog between the human agent and the human client and for automatically detecting keywords and keywords in context from the dialog as they occur during the dialog between the agent and client;

means for matching at least some of the detected keywords and key words in context with the reference keywords and keywords in context;

means for automatically analyzing information exchanged between the agent and the client to identify information useful to the agent for responding to the client during the contact within the associated database based upon the matched key words and key words in context; and a display device for presenting during the dialog the identified information and a prioritized list of recommended responses sorted by ranking of importance to the agent for selection by the agent during the dialog between the human agent and the human client which is continually updated during the dialog based on agent selections.

10. The apparatus for presenting information as in claim 9 wherein the means for classifying the contact type further comprises means for identifying a web page from which the contact originated.

11. The apparatus for presenting information as in claim 10 wherein the information delivered along with the contact further comprises an identifier selected from the group consisting of ANI, URL and e-mail.

12. The apparatus for presenting information as in claim 11 wherein the means for classifying the contact type further comprises client information retrieved using the identifier delivered along with the contact.

13. The apparatus for presenting information as in claim 9 wherein the means for classifying the contact type further comprises a contact destination provided by the client.

14. The apparatus for presenting information as in claim 9 wherein the identified information further comprising a plurality of presented information references.

15. The apparatus for presenting information as in claim 14 wherein the plurality of information references further comprises a plurality of prioritized references.

16. The apparatus for presenting information as in claim 15 wherein the prioritized references further comprises a weight assigned to each matched keyword that is used to prioritize the references.

17. An apparatus for presenting information to a human agent of an organization, such apparatus comprising:

a contact with a human client received by an automatic contact distributor of the organization;

a classification processor that automatically classifies the client into respective classifications of a plurality of client classifications based upon information delivered along with the contact each respective classification associated with a respective dictionary of reference keywords and keywords in context with weighted links to information resource in an associated database;

a contact distributor that selects a human agent from a plurality of human agents to handle the contact by a dialog between the agent and the client and delivers the contact to a communication device of the human agent to permit the human agent to conduct the dialog with the client;

a database containing the dictionaries of key words and key words in context and that retrieves the respective dictionary of reference key words and key words in context, based on the classification of the client;

an artificial agent that automatically monitors the dialog between the human agent and the human client and automatically detects keywords and keywords in context from the dialog as they occur during the dialog between the human agent and human client;

a matching processor that matches at least some of the detected keywords and key words in context with the respective reference keywords and keywords in context;

a knowledge base that automatically analyzes information exchanged between the human agent and the human client during the dialog to identify information useful to the agent for responding to the client during the contact within a database based upon the matched key words and key words in context; and an agent terminal that presents, prioritized and continually updated based on agent selections, the identified information to the agent during the dialog between the human agent and the human client including responses suggestions and recommended resources to the human agent useful to the human agent for handling the contact responsive to actions of the human agent during the dialog.

18. The apparatus for presenting information as in claim 17 wherein the information delivered along with the contact further comprises an identifier of a web page from which the contact originated.

19. The apparatus for presenting information as in claim 17 wherein the information delivered along with the contact further comprises a source identifier selected from the group consisting of ANI, URL and e-mail.

20. The apparatus for presenting information as in claim 19 wherein the means for classifying the contact type further comprises client information retrieved using the identifier delivered along with the contact.

21. The apparatus for presenting information as in claim 17 wherein the information delivered along with the contact further comprises a contact destination provided by the client.

22. The apparatus for presenting information as in claim 17 wherein the identified information further comprising a plurality of information references.

23. The apparatus for presenting information as in claim 22 wherein the plurality of information references further comprises a plurality of prioritized references.

24. The apparatus for presenting information as in claim 23 wherein the prioritized references further comprises a prioritization weight calculated by summing the weights assigned to each matched keyword and adjusting the summed weight by creating linkage between keywords based upon selections made by the agents and adjusting the linkages based upon selection weightings assigned to the agents.

* * * * *